Nov. 30, 1926.                                                              1,609,135
W. F. STATHAM
APPARATUS FOR REMOVING SEDIMENT FROM STILLS
Filed June 2, 1921                         2 Sheets-Sheet 1
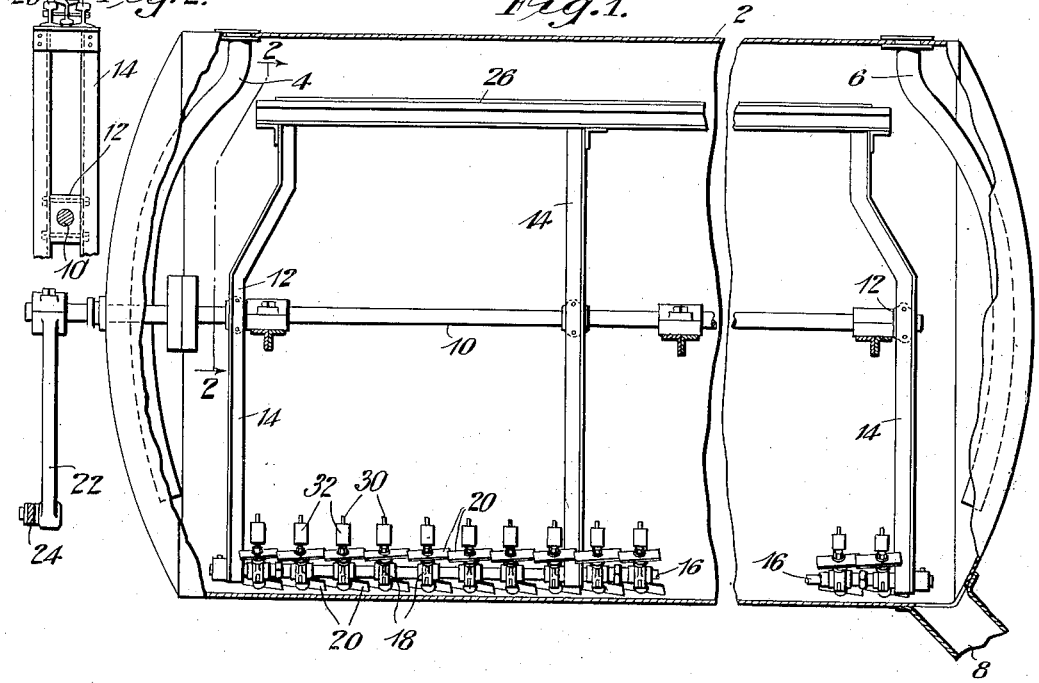
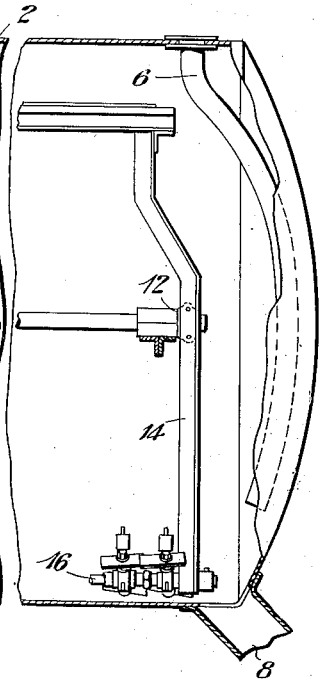
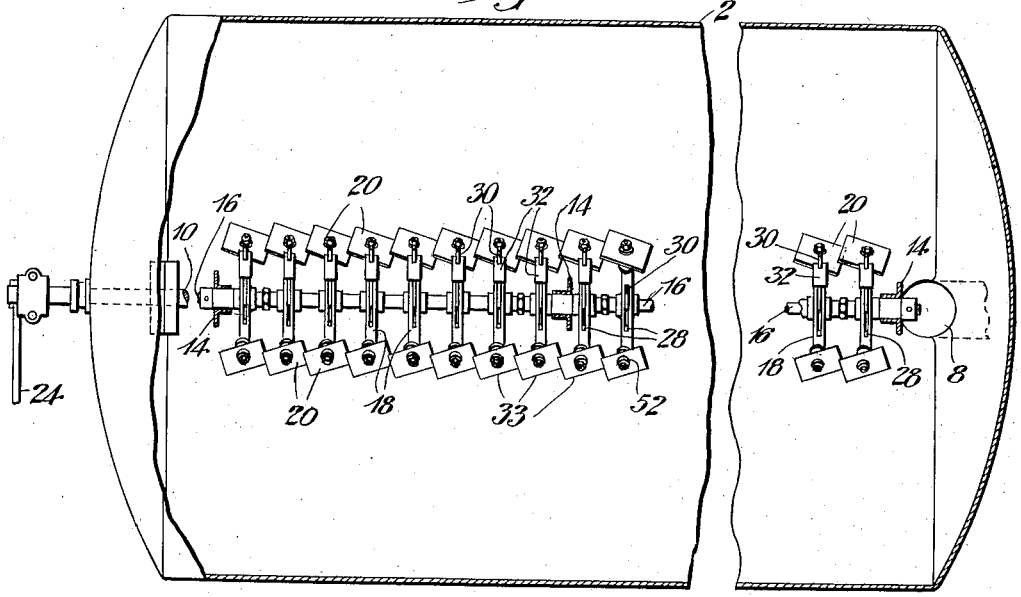
William F. Statham Inventor
By His Attorney
Edmund G. Borden

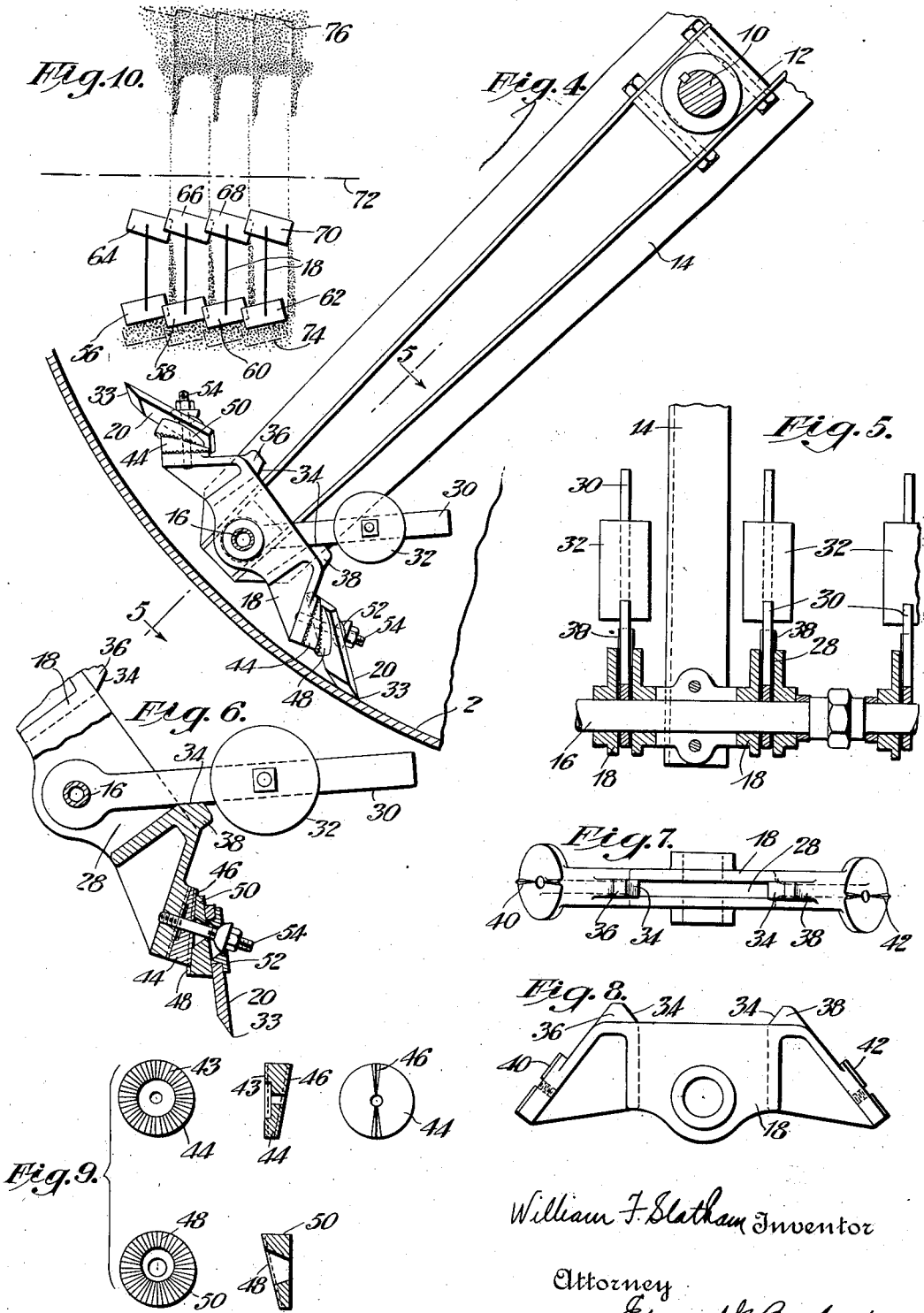

Patented Nov. 30, 1926.

1,609,135

UNITED STATES PATENT OFFICE.

WALTER F. STATHAM, OF BARTLESVILLE, OKLAHOMA, ASSIGNOR, BY MESNE ASSIGNMENTS, TO DOHERTY RESEARCH COMPANY, OF NEW YORK, N. Y., A CORPORATION OF DELAWARE.

APPARATUS FOR REMOVING SEDIMENT FROM STILLS.

Application filed June 2, 1921. Serial No. 474,424.

This invention relates to an improved apparatus for removing sediment from a still. The preferred embodiment of the invention hereinafter described is particularly intended for use in "pressure stills" for simultaneously distilling and cracking oil.

In the operation of pressure stills, which are ordinarily heated by fires beneath them, considerable amounts of sediment composed of carbon, coke and the like are deposited on the bottoms of the stills within their heating zones. These deposits of sediment are a source of much trouble and danger inasmuch as they tend to insulate the contents of the still from the heat of the fire and also frequently cause portions of the shell of the still upon which they become baked to be burned out and destroyed. In cases where a still is thus damaged, disastrous fires often occur by reason of oil flowing from the still into the fire beneath. It is, therefore, very desirable that the heating zone of a still be kept free from deposits of sediment, particularly in the event that the still is to be used constantly for long periods of time as in the continuous distillation of oil.

It is an object of this invention to provide an apparatus for removing sediment from a still which will prevent the still from being damaged owing to deposits of sediment on it and will reduce so far as possible the heat insulating effect of the sediment.

To this end, in accordance with an important feature of the invention, the sediment which gravitates to the bottom of the still is separated generally into a plurality of rows disposed longitudinally of the still, and the sediment in each row is moved lengthwise of the still away from the heating zone. In the illustrated exemplification of the invention, a still is employed which is provided with a residue outlet at one end; the sediment which tends to adhere to or bake on the still is scraped from it; the deposit of sediment is separated generally into two rows on opposite sides of the vertical plane of the center line of the still; and the sediment in each row is moved progressively toward the residue outlet. This apparatus removing the sediment reduces its heat insulating effect to a minimum since not only is the deposit of sediment decreased in thickness by being separated into two rows, but a large part of each of the rows of sediment is located away from the hottest portion of the still, that is, the portion adjacent to the vertical plane of the center line of the still.

Another feature of the invention resides in the provision of mechanism operating automatically to separate the sediment which gravitates to the bottom of a still generally into two rows and to move the sediment in each row lengthwise of the still away from the heating zone of the still. Preferably and as shown, the mechanism above referred to comprises a carrier disposed lengthwise of the still and adjacent to the heating zone of the still and supporting transversely arranged holders on the ends of which are mounted blades which, upon oscillation of the carrier, operate to scrape the sediment to one side or the other of the vertical plane of the center line of the still and to move it toward the residue outlet of the still.

It is very desirable that scraper blades for oil stills should be capable of yielding away from the still in order that they may closely engage it in their normal operation and may nevertheless, adapt themselves without breakage to immovable obstructions on the inner surface of the still, such, for example, inequalities in the shell of the still. Practical difficulties have, however, been experienced in the use of such blades in that the blades when moved away from the still are often caused to stick in their retracted positions because of the viscous nature of the contents of the still. In such cases, of course, they no longer operate efficiently to scrape the still. In order to obviate this difficulty, a further feature of the present invention contemplates the provision of scraper blades mounted for yielding movement away from the still, and impact means for forcing the blades against the wall of the still. In the illustrated construction, the impact means comprises weighted arms acting by gravity to strike blows on the blade holders of sufficient force to positively place the blades in operative position.

Although the invention will be hereinafter described in its application to oil stills of the type generally called "pressure stills", it is recognized that the utility of the invention is not limited thereto but that it may be employed for the removal of sediment from oil stills of other types and from receptacles of other kinds. It is, therefore, intended that the scope of the invention shall not be restricted except as required by the claims.

Other objects and features of the invention will appear as the description proceeds and will be pointed out in the claims. A preferred embodiment of the invention, inclusive of its various features, is illustrated in the accompanying drawings, in which:

Fig. 1 is a view in elevation of a still having one of its sides broken away to reveal the scraping mechanism;

Fig. 2 is a view of a portion of the scraping mechanism taken along the line 2—2, Fig. 1, looking in the direction of the arrows;

Fig. 3 is a view in plan with the upper portions of the still and scraping mechanism broken away to disclose the blade holders and blades of the scraping mechanism;

Fig. 4 is an end view of the lower portion of the scraping mechanism;

Fig. 5 is an elevation of the scraping mechanism taken along the line 5—5, Fig. 4, looking in the direction of the arrows;

Fig. 6 is a view partly in section of one side of one of the oscillating blade holders and weighted arm which controls the operation of the holder;

Fig. 7 illustrates one of the holders in plan;

Fig. 8 is a view of the holder in side elevation;

Fig. 9 illustrates the wedge-shaped discs which determine the angular relation of the blades to the holders, and Fig. 10 is a diagrammatic view showing the manner of operation of the scraper blades.

The illustrated embodiment of the invention comprises a horizontal cylindrical still 2 provided with oil inlet pipes 4 and 6 (Fig. 1). The still 2 is further provided with an outlet 8 communicating with the bottom of the still adjacent to its right hand end and serving to conduct from the still all the residual products resulting from the distillation including the sediment which collects on the inner surface of the still.

Supported in the still 2 on a shaft 10 coinciding substantially with the axis of the still is an oscillating frame 12 comprising upright bars 14 fast on the shaft 10. The lower ends of the bars 14 sustain a rod 16 which constitutes a carrier for a series of holders 18 upon which are mounted scraper blades 20. The carrier rod 16 is disposed lengthwise of the still 2 adjacent to the bottom or heating zone of the still and is arranged to be moved upon oscillation of the frame 12 in a path substantially parallel to the heating surface of the still. The blade holders 18 are mounted on the carrier rod 16 for oscillation relatively to the rod in planes transverse to the rod, and the holders and blades are so arranged as to cause the blades to engage the still 2 upon operation of the frame 12 and to scrape from it any sediment or other material which may tend to adhere to it.

Preferably, the frame 12 is oscillated substantially 45 degrees to each side of the vertical plane of the center line of the still 2. As shown, this is effected by means of an arm 22 depending from one end of the shaft 10 and joined to an actuator 24. In order to counterbalance the weight of the blade holders 18 and the parts associated with them, the bars 14 of the frame 12 are extended upwardly beyond the shaft 10, and rails 26 are secured to their upper ends.

The blade holders 18 (Fig. 7) are formed with slots 28, and fulcrumed on the rod 16 in the slot of each of the holders is an arm 30 carrying a weight 32. The arms 30 are movable relatively to the blade holders 18 between surfaces 34 on lugs 36 and 38 upstanding from the blade holders at opposite ends of the slots 28. The blade holders 18 are all of substantially equal length and each of them extends substantially equal distances on both sides of the rod 16. Scraper blades 20 are secured to both ends of each of the holders 18 and are arranged in two series one on each side of the rod 16 and at equal distances from the rod. The arrangement of the swinging arms 30 relatively to the holders 18 is such that when the carrier frame 12 has been moved substantially to the limit of its movement to the left (Fig. 4), the lugs 36 have carried rods 30 to positions in which the centers of weights 32 lie to the right of the perpendicular through the rod 16. The arms 30 under the action of gravity then move along the slots 28 of the blade holders 18 until they impinge upon the lugs 38. By their impact against the lugs 38, the arms 30 cause the blades at the right of the holders 18 to be moved into engagement with the still 2, and the weight of the arms maintains the blades against the still during the reverse movement of the frame 12 to the right. Conversely, when the frame 12 attains substantially to the limit of its movement to the right, the lugs 38 have moved the arms 30 to positions in which the perpendiculars through weights 32 lie to the left of the rod 16 thereby causing them to traverse the slots 28 in the opposite direction so as to engage the lugs 36 and force the blades at the left of the holders 18 into engagement with the still.

If any of the holders 18 should tend to stick on the carrier rod 16, the tendency would be overcome by the force of the blow imparted to the holder by the weighted arm 30. The blade holders 18 are, however, movable independently on the rod 16 so that if for any reason the proper functioning of one of the holders and the blades carried by it should fail, the operation of the scraping blades on the other holders would not be interfered with.

As clearly appears from Figs. 3 and 10, the scraper blades 20 of each series over-lap somewhat in planes transverse to the still and have their cutting edges 33 inclined toward the residue outlet 8, the edges of the blades of each series being disposed in substantially parallel relation to each other. The blades 20 are secured to the holders 18 by means designed to enable the angular relation of the blades to the holders 18 and, consequently, the degree of inclination of the edges of the blades to the rod 16 to be varied as desired. As shown, such means includes teeth or serrations 40 and 42 on the ends of the blade holders, with which any two of a series of teeth 43 on a wedge-shaped disc 44 are arranged to interlock. The disc 44 is in turn provided with serrations 46 constructed to mesh with teeth 48 on a second wedge-shaped disc 50. Each of the blades 20 is formed with an opening in which is received a shouldered washer 52, and the whole assemblage comprising the discs 44 and 50, blade 20, and washer 52 is clamped to the blade holder by a screw 54.

The serrations 40 and 42 (Fig. 7) are disposed on opposite sides of the center line of the blade holders 18 so as to cause the blades on one side of the rod 16 to extend across the portion of the still where the fields of action of the blades on the opposite side of the rod merge, so as to insure that all portions of the shell of the still will be effectively scraped.

The sediment removing mechanism of this invention operates in accordance with a novel process which will be explained by reference to Fig. 10, wherein the reference numerals 56, 58, 60 and 62 denote blades on four adjacent holders 18 at one side of the rod 16, and numerals 64, 66, 68 and 70 designate blades on the other ends of the blade holders and on the opposite side of the rod 16 from the first-mentioned blades. The vertical plane of the center line of the still 2 is indicated in Fig. 10 by the numeral 72, and the limits of movement of the blades 20 to the right and left (Fig. 4) are exhibited by broken lines 74 and 76 respectively. Assuming that the frame 12 is being moved to the right (Fig. 4), the blades 56, 58, 60 and 62 will be in scraping engagement with the still. The sediment engaged by the blades will be swept before them and will, at the same time, move gradually toward the right hand ends of the blades as seen in Fig. 10. Consequently, a considerable portion of the material engaged by the blades passes off their ends before they reach the limit of their movement indicated by the broken line 74. This material is thus collected along lines extending transversely of the bottom of the still. During the first part of the movement of the blades, however, there will be little sediment in front of them, and, consequently, sediment will pass off the ends of the blades only in small amounts. As the amount of sediment being swept along by the blades increases, the tendency for the sediment to be crowded along them is enhanced, with the result that the lines of sediment extending transversely of the still gradually decrease in amount as they approach the vertical plane of the center line of the still. The sediment which does not pass off the ends of the blades 56, 58, 60 and 62 in their movement toward the right is collected in a row extending lengthwise of the still and disposed at the right-hand side of the center line of the still. When the blades 56, 58, 60 and 62 approach the points on the still indicated on Fig. 10 by the broken line 74 the weighted arms 30 are swung to the left in the slots 28 and the blade holders 18 are oscillated to raise the blades 56, 58, 60 and 62 out of engagement with the still and to urge the blades 64, 66, 68 and 70 into scraping engagement with the still. Upon subsequent movement of the frame 12 and rod 16 to the left, the blades 64, 66, 68 and 70 act in a manner similar to that of the blades 56, 58, 60 and 62, collecting a portion of the sediment engaged by them into a row adjacent to the line 76 with lines of sediment of gradually decreasing density extending downwardly from it toward the vertical plane of the center line of the still.

It is apparent from Fig. 10 that when the blades 56, 58, 60 and 62 are raised and the blades 64, 66, 68 and 70 are depressed, the blade 64 is in position to engage the sediment which passes off the end of the blade 56 on the preceding movement of the frame 12, with the exception, however, of that portion of the sediment lying between the blades 56 and 64. The portion of the sediment engaged by the blade 56 on the preceding movement of the frame 12 which passed off its end between the point where the blade 56 is lifted from the still and the point where the blade 64 engages the still will remain on the right-hand side of the blade as viewed in Figs. 3 and 10. The manner of operation of the blades 58, 60 and 62 is analogous to that of the blade 56 in that only a portion of the sediment engaged by them on their movement to the right is affected by the blades 66, 68 and 70 on the succeeding movement of the frame 12 to the left. In a similar manner, a considerable part of the material engaged by the blades 64, 66, 68 and 70 on the movement of the frame 12 to the left is not affected by the blades 56, 58, 60 and 62 on their subsequent movement to the right. The sediment disposed between the points where one set of blades leaves the still and the other set engages it upon reversal of the movement of the carrier may be considered generally as a part of the longitudinal row of sediment on the side of the still toward which the first-mentioned blades travel in their operative movement.

Inasmuch as the blades 56, 58, 60 and 62 are located at substantially equal distances from the carrier rod 16, the sediment which passes off the end of any of the blades is located rearwardly of the next succeeding blade of the series and hence is not engaged by it on that movement of the blade. Since, however, the blades over-lap each other at their ends, as previously explained, the sediment will be engaged by the last-mentioned blade on the next movement of the blades in the same direction and will be swept by it away from the center line of the still and toward the residue outlet 8. The sediment which is moved upwardly along the shell of the still by one or the other series of blades tends to drop back toward the center line of the still when freed from control by the blades and hence comes into position to be engaged by the blades upon the next subsequent movement of the frame 12 in the same direction.

It will be evident from the foregoing that the scraper blades of this invention not only detach from the still any sediment which may tend to adhere to the still but also separate the sediment which may collect on the bottom of the still generally into two rows disposed lengthwise of the still and on opposite sides of the vertical plane of the center line of the still. The scraper blades also move the sediment in each row progressively toward the residue outlet 8. Not only is the separation of the sediment generally into two rows of advantage in reducing the thickness of the deposit of sediment and thereby lessening the heat insulating effect of the sediment on the contents of the still, but the sediment can be more readily handled in small amounts both with respect to preventing it from baking on the still and also in sweeping it along the still toward the residue outlet.

Having fully described my invention, what I claim as new and desire to secure by Letters Patent of the United States is:

1. In combination a still, means within the still for scraping the bottom of the still, said means including mechanism for separating the sediment which collects on the bottom of the still generally into two rows and for moving the sediment in each row lengthwise of the still.

2. In combination a still, oscillating means in the still for separating the sediment which collects at the bottom of the still generally into two rows, said means including mechanism for moving the sediment in each row lengthwise of the still.

3. In a mechanism for scraping a still or other receptacle, an oscillatable carrier, a holder mounted for oscillation relatively to the carrier, scraper blades on the holder inclined to the plane of oscillations of said carrier, and means for imparting to and fro movement to the carrier transversely of the receptacle to move the scraper blades across the receptacle.

4. In combination a still, a carrier, a holder mounted on the carrier for oscillation relatively to the carrier in a plane transverse to the carrier, blades mounted on the holder at each side of the carrier, and means for imparting to and fro movement to the carrier in a path substantially parallel to the plane of oscillation of said holder.

5. In a mechanism for scraping a still or other receptacle, a carrier mounted for to and fro movement in the receptacle, a holder mounted on the carrier for oscillation relatively to the carrier in a plane substantially parallel to the path of to and fro movement of the carrier, blades secured to the holder at each side of the carrier, and means on the carrier for urging said blades alternately into scraping engagement with the receptacle upon movement of the carrier.

6. In an apparatus for distilling oil comprising a still and an internal scraper therefor, the combination of a carrier disposed longitudinally of the still, means for oscillating the carrier transversely of the still, holders mounted loosely and independently on the carrier for oscillation relatively to the carrier in planes transverse to the carrier, scraper blades mounted on each of the holders at the opposite sides of the carrier, and a weighted arm loosely mounted on the carrier adjacent to each of the holders and movable relatively to the holder to cause the weight of the arm to be imposed alternately on opposite ends of the holder so as to maintain the blades on the holder yieldably in scraping engagement with the shell of the still.

7. In an apparatus for distilling oil comprising a still having a residue outlet at one end and an internal scraper for said still, the combination of a carrier disposed longitudinally of the still, means for oscillating the carrier transversely of the still, holders mounted on the carrier for oscillation relatively to the carrier in planes transverse to the carrier, and scraper blades mounted on the ends of the holders, the blades on the successive holders being arranged in rows on opposite sides of the carrier and the cutting edges thereof converging toward the residue outlet.

8. In a mechanism for scraping a still or other receptacle, a carrier disposed lengthwise of the receptacle, means for oscillating the carrier transversely of the receptacle, a series of holders mounted on the carrier for oscillation relatively to the carrier in planes transverse to the carrier, a series of scraper blades mounted on the holders, means for oscillating the holders to raise the blades from the receptacle when they are substantially at the limit of their movement in one direction and to lower them again into engagement with the receptacle when they are substantially at the end of their reverse movement, said blades being arranged to over-lap each other in the direction longitudinally of the receptacle so that upon operative movement of the blades each of them engages the sediment which passed off the end of the next prior blade of the series upon the preceding operative movement of the blades.

9. In an apparatus for distilling oil comprising a still and an internal scraper therefor, the combination of a carrier, means for oscillating the carrier transversely of the still and adjacent to the heating surface of the still, a series of holders oscillatably mounted on the carrier, scraper blades carried by the holders, and means for securing the blades to the holders in any desired angular relation thereto, said means including wedge shaped discs constructed to interlock with each other and with the ends of the holders.

10. In an apparatus for distilling oil comprising a still and an internal scraper therefor, the combination of a carrier, means for oscillating the carrier transversely of the still and in a path substantially parallel to the heating surface of the still, a holder pivotably mounted on the carrier and formed with a slot, a weighted arm fulcrumed on the carrier and received in the slot of the holder, and a scraper blade carried by the holder, said arm adapted to swing and strike the holder to force the blade into scraping engagement with the still substantially at the end of a movement of the carrier.

11. In a mechanism for scraping the interior of a still or other receptacle, a carrier, a holder movably mounted on the carrier, a scraper blade carried by the holder and movable away from the receptacle upon movement of the holder in one direction with relation to the carrier, and means for striking a blow on the holder to move it in the opposite direction relatively to the carrier and thereby to force the scraper blade against the still.

12. In a mechanism for scraping the interior of a still or other receptacle, a carrier, a series of holders on the carrier extending to each side of the carrier, scraper blades on the ends of each holder, means for imparting to and fro movement to the carrier, and means for striking blows on the holders alternately on opposite sides of the carrier and previous to the advance of the carrier in either direction to force the scraper blades on the advance side of the carrier against the still and to raise the blades on the other side of the carrier from the still.

13. In a scraping mechanism, the combination of a pivotally supported scraping device, means under the influence of gravity tending to rotate said device about its pivot, said means comprising a member adapted to impart a blow to said device at a point remote from the pivot thereof and thereafter to exert pressure on the scraping device at said point.

14. In a scraping mechanism, the combination with a pivotally supported scraping device, of a weight swingable in the same direction as the pivotally mounted scraping device, said weight when in an unstable position adapted to strike a blow tending to rotate said device whereby the latter may more effectually bite into the material to be scraped.

In testimony whereof I affix my signature.

WALTER F. STATHAM.